Patented Aug. 8, 1933

1,921,767

UNITED STATES PATENT OFFICE 1,921,767

METHOD OF MAKING ACID HALIDES

Lindley E. Mills, Midland, Mich., assignor to The Dow Chemical Company, Midland, Mich., a Corporation of Michigan No Drawing. Application May 20, 1929
Serial No. 364,697

9 Claims. (Cl. 260—123)

The present invention relates to the preparation of acyl halides, and more particularly to methods involving the acidolysis of side-chain halogen substituted derivatives of toluene leading to the ultimate formation of acyl chlorides. By acidolysis I mean the action of acids corresponding to hydrolysis obtained through the use of water.

The reactivity of the side-chain halogen atoms in halogen substituted toluene derivatives towards substances such as water, acids, alcohols, esters, phenols and amines has been long known. Various workers have reacted benzotrichloride with acetic acid in the presence of compounds of certain metals, e. g. zinc. Usually, mixtures were obtained which included acid anhydrides, mixed acyl anhydrides and acyl chlorides, such complex mixtures being difficult to separate into the components.

I have now found that this same general method may be applied for the synthesis jointly of benzoyl halide, or a ring substituted derivative thereof, and the acyl halide corresponding to the acyl employed and that said acyl halides are easily separable from each other and are obtained in good yields. My improved method consists in reacting the components in equimolecular proportions as given in Equation I;

I. 

(where R denotes a benzene residue, R' either an alkyl, aryl or aralkyl residue and X a halogen) and in such a manner that the tri-halogen compound is always present in excess of the acid in the mixture during the progress of the reaction.

A more specific case is shown in Equation II;

II. 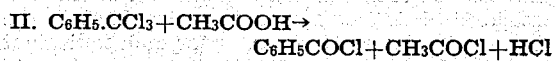

where two valuable acyl chlorides, e. g. benzoyl chloride and acetyl chloride, are obtained by the reaction between benzotrichloride and acetic acid.

The invention, then, consists of the procedure hereinafter fully described and particularly pointed out in the claims, the following description setting forth but a few of the various ways in which the principle of the invention may be used.

For the sake of simplicity, the present invention will be applied more specifically to reacting benzotrichloride with acetic acid, in approximately equimolecular amounts at temperatures from 80–140° C. and under the influence of certain catalysts, e. g. anhydrous cobalt chloride, anhydrous zinc chloride, etc., in such a manner that benzotrichloride is always in excess of the acetic acid in the reaction mixture. Hydrochloric acid and acetyl chloride pass out of the apparatus as gases during the reaction and are recovered by any suitable means. The residual mixture is then fractionally distilled to purify the benzoyl chloride and separate any acetyl chloride remaining therein. The following examples are given as illustrative of various ways in which my invention may be worked.

Example 1

In a flask provided with a mechanical stirrer, reflux condenser and suitable thermometer and feed arrangements were placed 396 grams of benzotrichloride and 0.5 grams of anhydrous cobalt chloride. The mixture was heated to 100° C., and at this temperature 120 grams of glacial acetic acid was gradually added during a period of three hours. The temperature of the water in the jacket of the reflux condenser was maintained at approximately 50° C., to permit the return of acetic acid to the flask and the passage of acetyl chloride and hydrochloric acid gas to a trap cooled in ice-water. The temperature of the reaction mixture was then maintained at 100° C. for an additional hour, after which time the still residue was cooled, removed from the flask and fractionally distilled. The first fraction, consisting of impure acetyl chloride, was united with the product collected in the aforementioned trap and the combined distillate again fractionated. The yield of acetyl chloride was 122 grams, equivalent to 78 per cent. of the theoretical amount. The second fraction from the fractional distillation consisted of 237 grams of benzoyl chloride, or 84.5 per cent. of the theoretical amount.

Example 2

In a manner similar to that described in Example 1, 195 grams of benzotrichloride and one gram of anhydrous zinc chloride were treated as follows: the mixture was heated to 120° C. and at this temperature, 128 grams of dichloracetic acid was dropped in continuously over a period of two hours. Dichloracetyl chloride distilled and collected in a receiver, while hydrochloric acid gas passed on through the apparatus. After twenty minutes additional heating at the same temperature, the residual mixture in the flask was fractionally distilled in the same manner as described in Example 1. The total yield of dichloracetyl chloride was 135 grams, equivalent to 92 per cent. of the theoretical amount. The yield of benzoyl chloride was 129 grams, or 92 per cent. of the theoretical amount.

Regarding the aforementioned catalysts, while I prefer to use anhydrous cobalt chloride or anhydrous zinc chloride, nevertheless other substances exert catalytic activity on the acidolysis of benzotrichloride. Other metal salts such as the anhydrous metal chlorides of antimony, copper and bismuth may be used. These likewise may be replaced by the salts of such metals with organic acids, or by the metals themselves, or even by a derivative of the metals as the oxide, hydroxide or oxyhydrate. It is, of course, understood that the various materials exerting catalytic activity on the reactions in question may be used either singly or in combination. The above-mentioned substances exerting catalytic activity on acidolytic reactions of the present character are hereinafter referred to as acidolytic catalysts.

Instead of using highly concentrated acids, e. g. glacial acetic acid, as described in the examples, aqueous acids may be employed. In such case, both the water and the organic acid enter into the reaction, forming lesser amounts of acyl halides and/or producing an aromatic acid e. g. benzoic acid from the further hydrolysis and/or acidolysis of benzoyl halide. Excess of organic acid and/or water carries the acidolysis and/or hydrolysis of benzotrihalide further i. e. some of the benzoyl halide is converted into benzoic acid.

I do not limit my invention to the use of the components mentioned in the examples. For instance, acetic acid may be replaced by other organic acids which form volatile acyl halides, e. g. the fatty acids such as propionic and butyric acids. Organic acids whose corresponding acyl halides are not volatile at moderate temperatures may also be employed, but in such case, the two acyl chlorides formed in the reaction require suitable separation by distillation or otherwise. Benzotrichloride may be replaced by its substituted derivatives when the substituent groups are not affected during the reaction, e. g. the various chlorbenzotrichlorides. Compounds of the type of benzotrichloride may be designated as aromatic tri-halo-methanes wherein three hydrogen atoms of methane have been replaced by halogen atoms and the remaining hydrogen atom has been substituted by an aromatic residue.

The present acidolytic method is, furthermore, a pronounced improvement over the process of obtaining benzoyl chloride by simple hydrolysis of benzotrichloride because only one acyl chloride is obtained in the hydrolysis, whereas in the acidolysis of benzotrichloride, two acyl chlorides are isolated in good yields. According to the method herein described, a benzoyl chloride and an acyl chloride may be prepared conjointly in good yield and chiefly separated in one operation.

By a similar procedure, bromo-compounds may be prepared from the corresponding aromatic tri-bromo-methanes and acids.

The term "acidolytic" is employed in the specification and throughout the claims as referring to reactions in which acidolysis occurs through the agency of acids in a manner analogous to hydrolysis through the agency of water.

Other modes of applying the principle of my invention may be employed instead of the ones explained, change being made as regards the method herein disclosed, provided the step or steps stated by any of the following claims or the equivalent of such stated step or steps be employed.

I therefore particularly point out and distinctly claim as my invention:—

1. The method of making benzoyl chloride and acetyl chloride conjointly which comprises heating benzotrichloride to a temperature between about 80° and about 140° C. and while maintaining said temperature gradually adding thereto approximately an equimolecular amount of acetic acid, in the presence of a catalyst selected from the class consisting of cobalt, zinc, antimony, copper, bismuth and the oxides, hydroxides, oxyhydrates, chlorides, and organic acid salts of said metals.

2. The method of making benzoyl chloride and acetyl chloride conjointly which comprises heating benzotrichloride to a temperature between about 80° and about 140° C. and while maintaining said temperature gradually adding thereto approximately an equimolecular amount of acetic acid, in the presence of zinc chloride.

3. The method of making benzoyl chloride and dichloroacetylchloride conjointly which comprises reacting benzotrichloride with dichloroacetic acid in approximately equimolecular proportions, the dichloro-acetic acid being gradually added to the benzotrichloride during the reaction.

4. The method of making benzoyl chloride and dichloroacetylchloride conjointly which comprises reacting benzotrichloride with dichloroacetic acid in approximately equimolecular proportions, in the presence of a catalyst selected from the class consisting of cobalt, zinc, antimony, copper, bismuth and the oxides, hydroxides, oxyhydrates, chlorides, and organic acid salts of said metals, the dichloro-acetic acid being gradually added to the benzotrichloride during the reaction.

5. The method of making benzoyl chloride and dichloro-acetyl chloride conjointly which comprises heating benzotrichloride to a temperature between about 80° and about 140° C., and gradually adding thereto approximately an equimolecular amount of dichloro-acetic acid in the presence of a catalyst selected from the class consisting of cobalt, zinc, antimony, copper, bismuth and the oxides, hydroxides, oxyhydrates, chlorides, and organic acid salts of said metals, and distilling dichloroacetyl chloride from the reaction together with hydrogen chloride substantially as formed.

6. The method of making a benzoyl halide and another acyl halide conjointly which comprises reacting a benzo-tri-halide with a monocarboxylic acid of the lower fatty acid series, the two reactants being employed in approximately the ratio of one mole of the former for each equivalent weight of the latter, and said monocarboxylic acid being added gradually to the benzo-tri-halide during the course of the reaction.

7. The method of making a benzoyl halide and another acyl halide conjointly which comprises heating a benzo-tri-halide to a temperature between 80° and 140° C. and, while maintaining said temperature, gradually adding thereto approximately one equivalent weight of a monocarboxylic acid of the lower fatty acid series for each mole of benzo-tri-halide employed.

8. The method of making a benzoyl halide and another acyl halide conjointly which comprises heating a benzo-tri-halide, in the presence of a catalyst selected from the class consisting of cobalt, zinc, antimony, copper, bismuth and the oxides, hydroxides, oxyhydrates, chlorides, and organic acid salts of said metals, to a temperature between 80° and 140° C. and, while maintaining said temperature, gradually adding thereto approximately one equivalent weight of a monocarboxylic acid of the lower fatty acid series for each mole of benzo-tri-halide employed.

9. The method of making benzoyl chloride and acetyl chloride conjointly which comprises reacting benzo-tri-chloride with acetic acid in approximately equimolecular proportions, the acetic acid being added gradually to the benzo-tri-chloride during the course of the reaction.

LINDLEY E. MILLS.